United States Patent [19]
Lampert et al.

[11] Patent Number: 5,719,977
[45] Date of Patent: Feb. 17, 1998

[54] OPTICAL CONNECTOR WITH IMMOVABLE FERRULE

[75] Inventors: Norman Roger Lampert, Norcross; Patricia Yvonne Reeves, Decatur, both of Ga.

[73] Assignee: Lucent Technologies Inc., Murray Hill, N.J.

[21] Appl. No.: 636,451

[22] Filed: Apr. 23, 1996

[51] Int. Cl.$^6$ .................................................. G02B 6/38
[52] U.S. Cl. ........................ 385/60; 385/68; 385/78; 385/84
[58] Field of Search ............................ 385/55, 56, 58, 385/60, 66, 68, 70, 72, 76, 77, 78, 84

[56] References Cited

U.S. PATENT DOCUMENTS

| | | | |
|---|---|---|---|
| 4,186,999 | 2/1980 | Harwood et al. | 385/66 |
| 4,875,754 | 10/1989 | Rao et al. | 385/84 |
| 4,934,785 | 6/1990 | Mathis et al. | 385/68 |
| 5,127,084 | 6/1992 | Takahashi | 385/140 |
| 5,481,634 | 1/1996 | Anderson et al. | 385/76 |

OTHER PUBLICATIONS

Young, et al., Fiber Connectors, in *Optical Fiber Telecommunications II*, at 301–325, (S. E. Miller, et al., eds, 1988). [no month] (Academic Press, Inc.).

R. Nagase, et al., Simplified SC-type Receptacles For Optical Subscriber Systems, in *Proc. 21st Eur. Conf. on Opt. Comm. (ECOC '95—Brussels)*, 421–424. 1995 [no month].

*Primary Examiner*—John D. Lee
*Attorney, Agent, or Firm*—Michael A. Morra

[57] ABSTRACT

A connector 20 for terminating an optical fiber 31 includes a one-piece molded plastic housing 200 having an exterior latch 220 that secures the housing to an associated receptacle 60. The latch is constructed as a cantilever with its fixed end positioned toward a front end of the housing. The housing includes an axial bore 205 for receiving an end portion of the optical fiber into its interior. This passageway extends longitudinally from a back end of the housing toward its front end, and is about half the length of the housing. The connector further includes a cylindrical structure 140-2 which extends longitudinally from a midpoint of the housing toward its front end. The cylindrical structure also includes an axial passageway 145 for receiving the end portion of the optical fiber, and is positioned within the housing such that the passageways are collinear and communicate with each other. Most importantly, the cylindrical structure is rigidly held within the housing and avoids the use of a spring. The connector is particularly useful when used in an end-to-end connection, via an appropriate adapter 600, with a conventional connector 10 that has a spring 160.

20 Claims, 5 Drawing Sheets

OPTICAL CONNECTOR WITH IMMOVABLE FERRULE

TECHNICAL FIELD

This invention relates to optical connectors, and more particularly to a simplified connector having a minimum number of parts.

BACKGROUND OF THE INVENTION

Optical fiber connectors are an essential part of substantially any optical fiber communication system. For instance, such connectors may be used to join segments of fiber into longer lengths; to connect fiber to active devices such as radiation sources, detectors and repeaters; or to connect fiber to passive devices such as switches and attenuators. The central function of an optical fiber connector is the maintenance of two optical fiber ends such that the core of one of the fibers is axially aligned with the core of the other fiber; and consequently, all of the light from one fiber is coupled to the other fiber. This is a particularly challenging task because the light-carrying region (core) of an optical fiber is quite small. In singlemode optical fibers the core diameter is about 8 microns where 1 micron =1 $\mu m=10^{-3}$ mm. Another function of the optical fiber connector is to provide mechanical stability and protection to the junction in its working environment. Achieving low insertion loss in coupling two fibers is generally a function of the alignment of the fiber ends, the width of the gap between the ends, and the optical surface condition of either or both ends. Stability and junction protection is generally a function of connector design (e.g., minimization of the different thermal expansion and mechanical movement effects). An optical fiber connector typically includes a small cylinder with a glass or plastic fiber installed along its central axis. This cylinder is interchangeably referred to as a ferrule or a plug.

In a connection between a pair of optical fibers, a pair of ferrules are butted together—end to end—and light travels from one to the other along their common central axis. In this conventional optical connection, it is highly desirable for the cores of the glass fibers to be precisely aligned in order to minimize the loss of light (insertion loss) caused by the connection. A variety of optical connectors are known in the art. For a discussion of such connectors, see, e.g., *Optical Fiber Telecommunication*, S. E. Miller and A. G. Chynoweth, editors, Academic Press (1988), especially pp. 301–325. One of the known connectors is referred to as an ST® (ST being a registered trademark of AT&T Corp.), and is shown in U.S. Pat. No. 4,934,785. This connector comprises a cylindrical ferrule, a base member which holds the ferrule, a compression spring, and a housing that surrounds the ferrule and spring. In this design, only the cylindrical ferrule needs to be of high precision and is typically made from a ceramic material. The cylindrical ferrule is held rigidly in the base member by an adhesive. The ferrule and the base member each include an opening that extends lengthwise from one end to the other. For clarity, these openings will be referred to as a "passageway" when discussing the ferrule, and a "bore" when discussing the base member.

And while the above connectors perform satisfactorily, they are relatively expensive because they have a high parts count. Additionally, because of the growing acceptance of optical fiber as the transmission media of choice for multimedia (i.e., television, data and telephone) communications, the need to provide higher density interconnection arrangements has emerged. It is therefore desirable to design an inexpensive optical connector having reduced parts count, and which installs easily in a small space.

One design of a connector having reduced size is discussed in a technical paper entitled Simplified SC-type Receptacles for Optical Subscriber Systems, which was published in the Proceedings of the 21st European Conference on Optical Communication (ECOC'95—Brussels) at pages 421–424. However, the simplified connector disclosed in FIG. 1(a) of this paper must be twist-locked into place, and the alignment sleeve must be handled as a loose part. And while its size is small, the ability to stack a large number of them together is limited by the need to manually grasp both sides during insertion and removal from a receptacle. Moreover, it is inconvenient to use because it not only requires a special tool, the connector cannot be inserted into the receptacle without first installing an intermediate component—the alignment sleeve. And finally, although FIG. 1(a) of this paper calls the ferrule as a single part, it actually comprises a cylindrical ferrule (ceramic) within a base member (metal or plastic) and should be counted as two parts.

What is needed, and what the prior art appears to be lacking, is an optical connector having fewer parts, reduced size, and which is easy to manually insert and remove from an associated receptacle without a tool or the need to grasp is opposite sides.

SUMMARY OF THE INVENTION

The connector of the present invention is used for terminating an optical fiber. It includes a one-piece molded plastic housing having an exterior latch the secures the housing to an associated receptacle. The latch is constructed as a cantilever with its fixed end positioned toward a front end of the housing. The housing includes an axial bore for receiving an end portion of the optical fiber into its interior. This passageway extends longitudinally from a back end of the housing toward its front end, and is about half the length of the housing. The connector further includes a ferrule which is immovably attached to the housing and extends longitudinally from a midpoint of the housing toward its front end. The ferrule includes an axial passageway for receiving the end portion of the optical fiber, and is positioned within the housing such that the bore and the passageway are collinear and communicate with each other. Because the ferrule is immovably attached to the housing, it avoids the use of a base member or a spring.

In an illustrative embodiment of the invention, a cylindrical ferrule holding a single optical fiber is shown, but it can be replaced with a generally rectangular ferrule that holds a plurality of optical fibers in an array. Nevertheless, the novel connector is joined, end-to-end, with a conventional connector via an adapter. Their ferrules press against each other without excessive force because the conventional connector includes a spring-loaded movable ferrule.

In the illustrative embodiment, the adapter used for joining optical connectors includes a pair or receptacles that are press-fit together in a back-to-back connection. The receptacle associated with the novel connector includes a keyway that permits all types of connectors to be inserted therein. However, the novel connector includes a protrusion (key) that precludes it from being inserted into conventional receptacles. This is because it is undesirable to make connections between two of the novel connectors since they are not spring-loaded to limit their engagement force.

It has been found that by reducing the number of parts needed in the construction of the novel connector, that its overall cost and size can be significantly reduced.

BRIEF DESCRIPTION OF THE DRAWING

The invention and its mode of operation will be more clearly understood from the following detailed description when read with the appended drawing in which.

DETAILED DESCRIPTION

Optical connector plugs are typically assembled using a spring-loaded, barrel-ferrule assembly. A multitude of parts are required depending on the connector type. Present state-of-the-art optical connectors, such as the ST, SC, FC and biconic connectors use many parts—a minimum comprising: (i) cable-boot, (ii) barrel, (iii) ferrule, (iv) spring, and (v) plug housing. Additional parts may also be required such as washers, retainer clips, a cap to restrain the spring, crimp-sleeves and various inserts. It has been determined that a substantial simplification in the design of a large class of optical connectors can be achieved by eliminating the spring. The class being referred to comprises those optical connectors that are intended to be connected to another optical connector. In this situation, only one of the optical connectors needs to have a spring for assuring end-to-end contact between ferrules while limiting the contact force.

Elimination of the spring enables the plug housing and the barrel to be a single part. Additionally, all of those parts which support a moving ferrule can be eliminated; and since the ferrule is immovable, the precautions associated with injecting adhesive into the barrel during insertion of an optical fiber are no longer operative. Such precautions were necessary to prevent excess adhesive from attaching the movable barrel/ferrule assembly to the housing. Surprisingly, by eliminating the spring, an optical connector can be manufactured for a fraction of the cost of its counterpart optical connector which has a spring.

Figure 1:
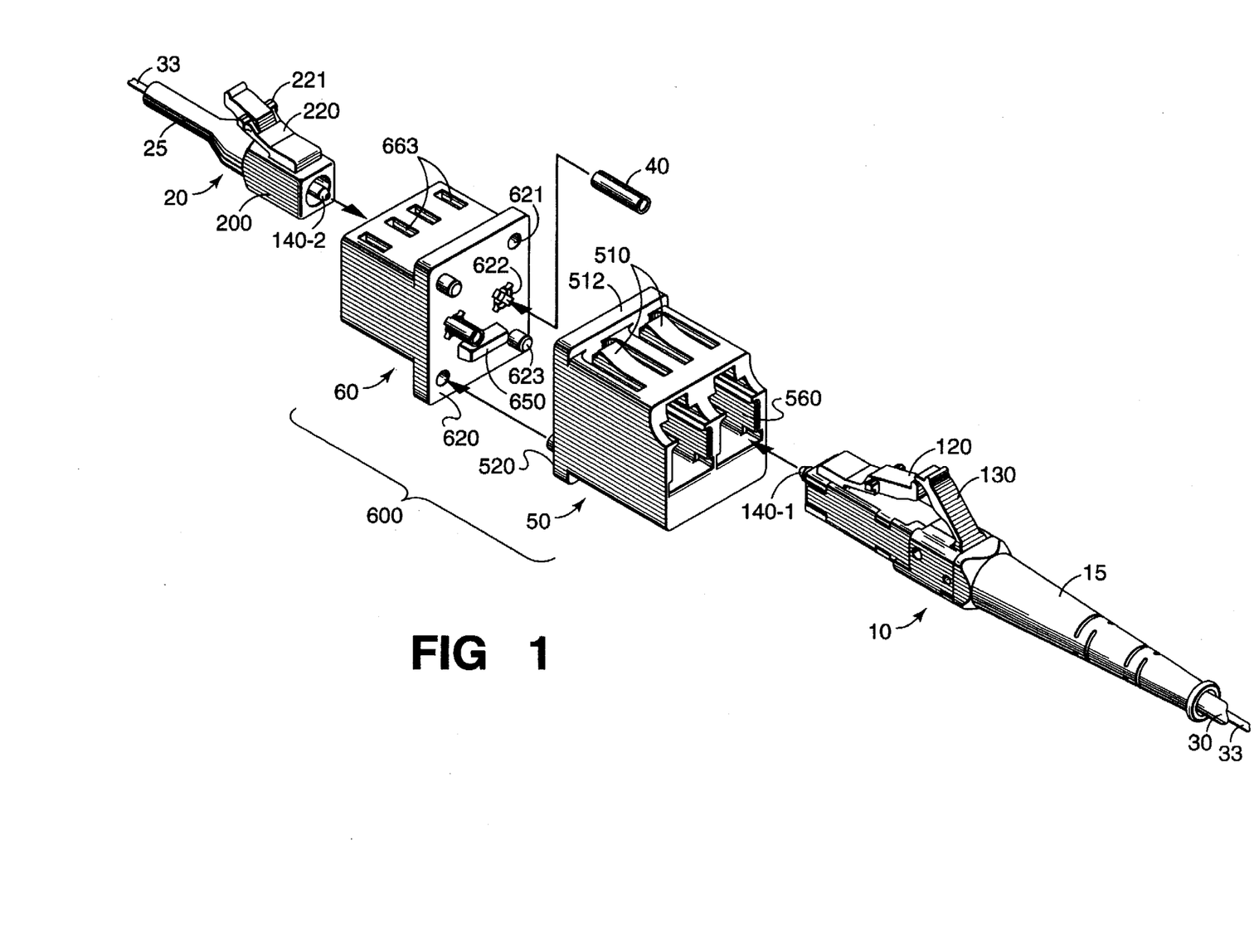
FIG. 1 is a top, front and right-side perspective view of an optical connector having an immovable ferrule arranged for interconnection, via an adapter, with an optical connector having a movable ferrule, the adapter being shown in exploded perspective view.
Figure 2:
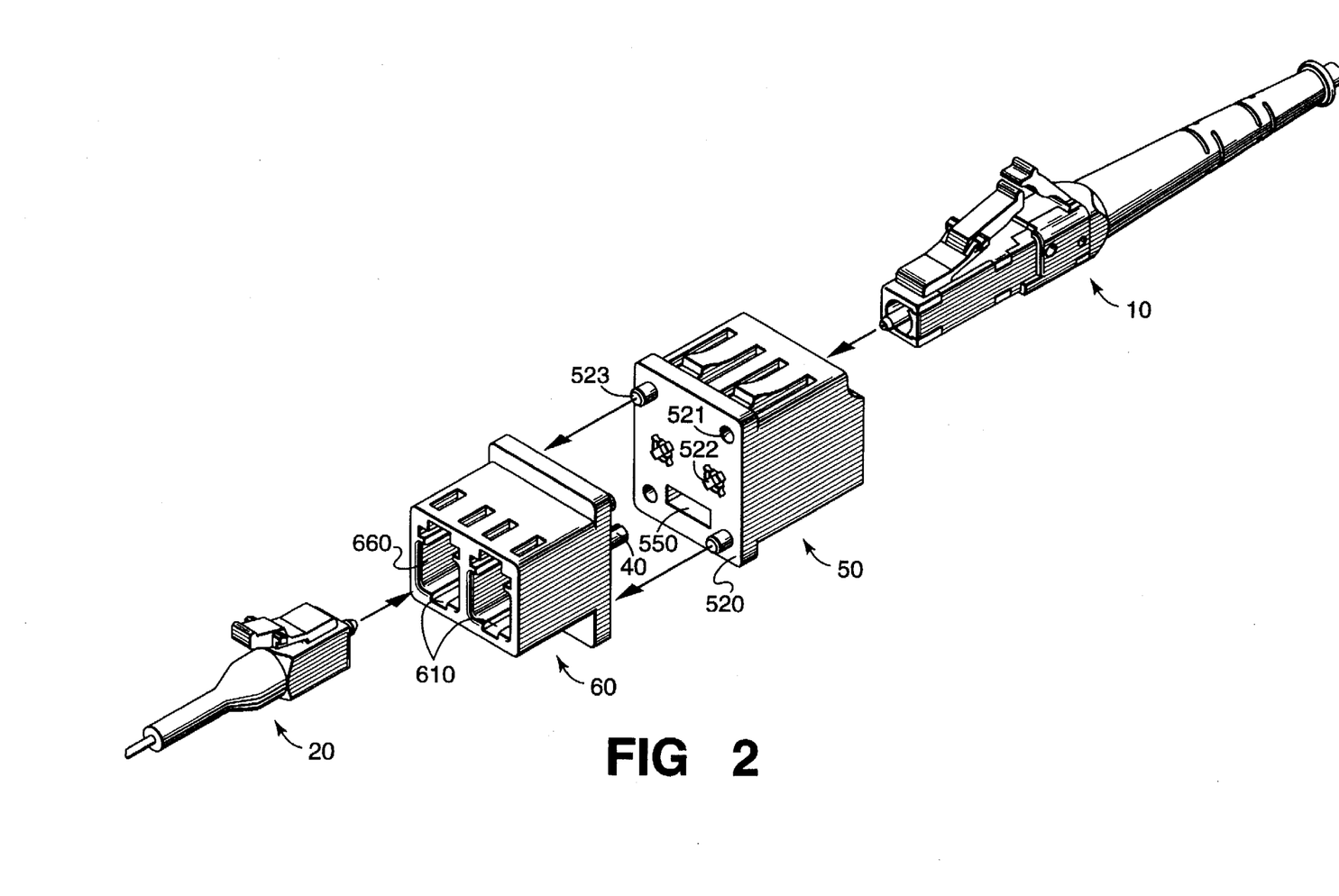
FIG. 2 is a top, back and right-side perspective view of the optical connector having an immovable ferrule shown in FIG. 1 arranged for interconnection, via an adapter, with the optical connector having a movable ferrule, the adapter being shown in exploded perspective view.

Reference is now made to FIGS. 1 and 2 which show different perspective views of the same components. In each drawing, optical connector 20 comprises a one-piece housing having an immovable ferrule 140-2, which is about to be interconnected with an optical connector 10 which comprises a multi-piece housing having a movable ferrule 140-1. FIG. 1 shows a front, top, and right-side perspective view of the novel optical connector 20; whereas FIG. 2 shows a rear, top, and left-side perspective view of optical connector 20. This interconnection is accomplished via adapter 600 which comprises a pair of duplex jack receptacles 50, 60 that are joined back to back. Each jack receptacle 50, 60 has a generally planar back surface 520, 620 that includes cylindrical pins 523, 623 that project outwardly, cylindrical holes 521, 621 that project inwardly, and openings 522, 622 for receiving an alignment sleeve 40. Illustratively, the pins and holes each have a nominal diameter of 1.5 millimeters (mm); but to assure a substantially permanent connection between the pins and holes, an interference of about 0.04 mm is used (i.e., each pin has a diameter which exceeds the diameter of its corresponding hole by about 0.04 mm). And, so that the pins can be readily inserted into slightly smaller holes, each pin includes a bevel on its distal end.

Each of the receptacles 50, 60 includes a cavity 560, 660 having a front end, a back end, and four sidewalls. The front end of each cavity includes a generally rectangular opening for admitting the optical connector into the cavity, the back end of each cavity includes a generally circular opening 522, 622 for enabling a ferrule 140-1, 140-2 within the optical connector to exit the cavity. At least one of the sidewalls has a latch-retaining ledge 664 (see FIG. 3) for interlocking with the latch 120, 220 on the optical connector.

An important difference between receptacles 50, 60 is the presence of a keyway 610 in receptacle 60 that enables optical connector 20 to be inserted. It is noted that optical connector 20 includes a key 210 (see FIG. 3) which precludes it from being inserted into receptacle 50. In this manner, optical connectors 20 that do not have movable ferrules cannot be connected to each other. Such interconnection might result in damage to the end faces of the ferrules 140-2 or, alternatively, the ferrules 140-2 might not touch each other and, consequently, optical signal loss is too great. On the other hand, connectors 10 having movable ferrules 140-1 do not include a similar key, and they can be connected to any other optical connector. Additional protection is provided by a tongue and groove system in the receptacles. So that two receptacles 60—60 cannot be joined together, receptacle 60 includes a tongue 650 that mates with a corresponding groove 550 in receptacle 50; but precludes it from being joined to a receptacle which also has a tongue.

During assembly, the alignment sleeves 40 are inserted into the openings 522 or 622 in one of the receptacles. The pair of jack receptacles 50, 60 are aligned so that the pins 523, 623 in each receptacle are respectively positioned to mate with the holes 621, 521 in the other receptacle, and the alignment sleeves 40 in one receptacle are positioned to mate with the openings (e.g., 522) in the other receptacle. These receptacles are then pressed together with sufficient force to cause their planar back surfaces 520–620 to touch each other. Because each pin 523, 623 is slightly larger than its respective mating hole 621, 521 the pair of receptacles can, advantageously, be press-fit together without adhesives or ultrasonic welding.

Optical connector 10, together with bend-limiting strain-relief boot 15, terminates optical cable 30. The general construction of such an optical connector having a multi-piece housing is disclosed in U.S. Pat. No. 5,481,634. The outside surface of the connector 10 includes a spring-latch 120 that is used for securing the connector to an associated receptacle 50 in order to prevent unintended decoupling between the two. So that latch 120 will not snag other cables when pulled through a concentrated area of same, trigger 130 prevents snagging and, incidentally, makes latch 120 easier to manually operate. Connector 10 terminates optical cable 30 which includes a thin glass fiber that is typically coated with two layers of ultraviolet-curable materials (polyacrylate for example) for protection. The coated fiber is then covered with a thermoplastic having sufficient stiffness to preclude fiber buckling and is referred to as a buffered fiber 33 which has an outer diameter of about 0.9 mm. Ferrule 140-1 comprises a glass, metal, ceramic or plastic cylinder having a narrow passageway along its central axis for receiving an end portion of an optical fiber.

Optical connector 20 comprises a housing 200 and a ferrule 140-2. A bend-limiting boot 25 is attached to the back end of housing 200 to protect buffered fiber 33 from excessively sharp bends which may either break the fiber or cause a high degree of optical signal loss. The outside surface of the connector 20 includes a movable spring-latch 220 which is used for securing the connector to an associated receptacle in order to prevent unintended decoupling between the two. The connector and latch are molded from a commodity thermoplastic in order to achieve a low-cost, lightweight housing. Spring-latch 220 is molded into the housing and includes a living hinge which allows it to be moved up and down in a direction which is perpendicular to a central axis of the connector 20. Ferrule 140-2 comprises a glass, metal, ceramic or plastic cylinder having a narrow passageway (about 126 μm in diameter) through its central axis for receiving an end portion of an optical fiber. Illustratively, the ferrule has an outer diameter of about 1.25 mm, a length of about 7.0 mm, and is preferably made from a ceramic material such a zirconia. In this illustrative embodiment, connector 20 has a footprint (cross-section dimension) of 4.6 by 4.6 mm, and plastic housing 200 is preferably overmolded onto ferrule 140-2. A suitable process for overmolding a plastic housing onto a ferrule is disclosed in application Ser. No. 08/428,804 which was filed on Apr. 24, 1995 and is hereby incorporated by reference.

Receptacle 60 is molded from a thermoplastic material, such as polycarbonate, and is designed for ease of molding. For example, openings 663 provide direct access for a slide to a molded pair of latch-retaining ledges 664 (see FIG. 3) within the cavity of the receptacle that cooperate with tab shoulders 221 to lock optical connector 20 into the receptacle. Accordingly, a simple molding slide lo can be used to create the latch-retaining ledges.

Figure 3:
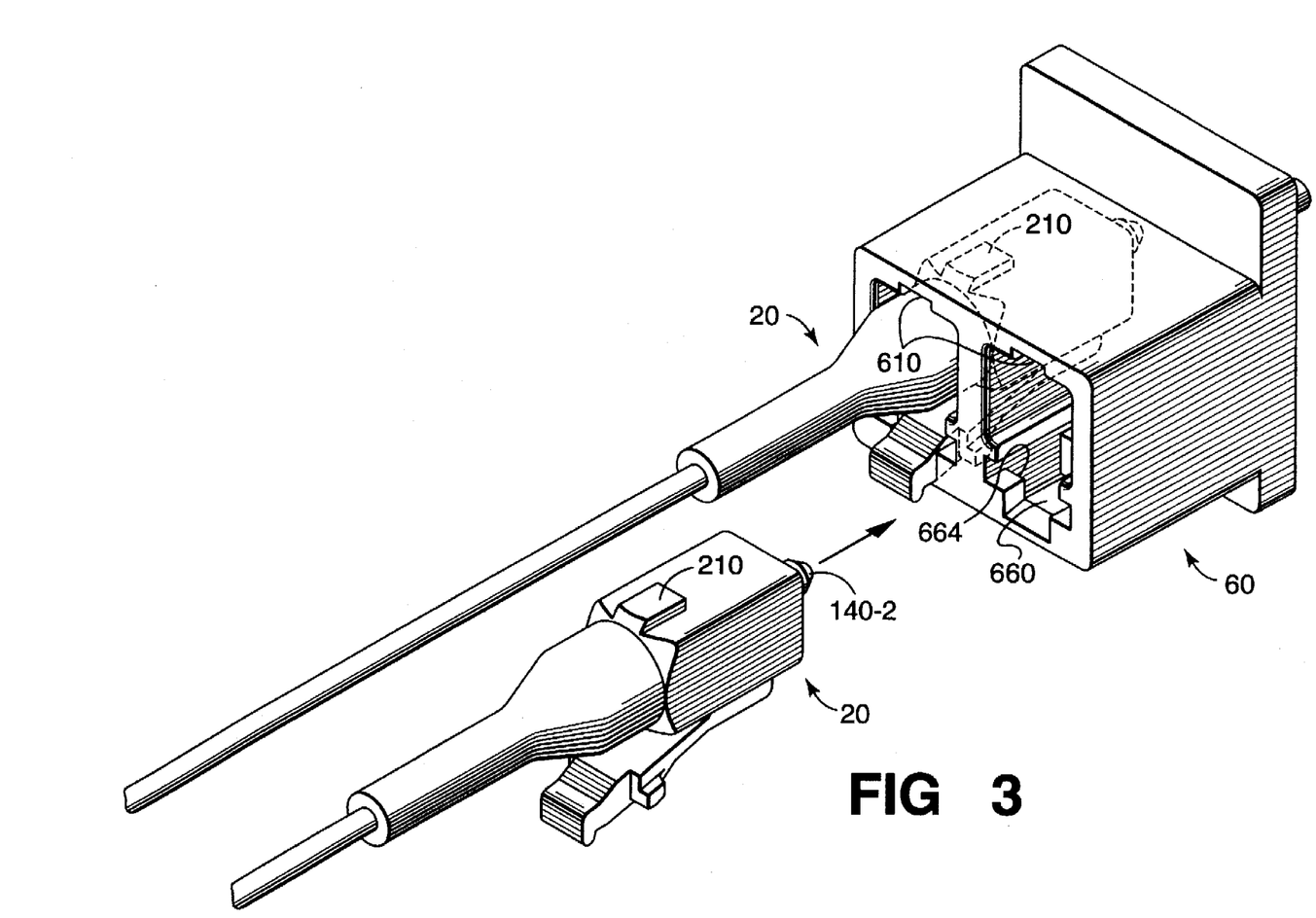
FIG. 3 is a bottom, back and left-side perspective view of a pair of optical connectors having immovable ferrules, one of the connectors being shown inserted into an associated receptacle.

Referring now to FIG. 3, a bottom, back and left-side perspective view of a pair of optical connectors 20 having immovable ferrules 140-2 is shown with one of the connectors inserted into an associated receptacle 60. The bottom side of connector 20 includes a protruding key 210 that precludes the connector from be inserted into any receptacle such as receptacle 50 which does not have a mating keyway. Mating keyways 610, however, are molded into receptacle 60. It is noted that optical connector 10 (see FIGS. 1 and 2) readily fits into either opening of receptacle 60; but that connector 20 does not fit into either opening of receptacle 50.

Figure 4:
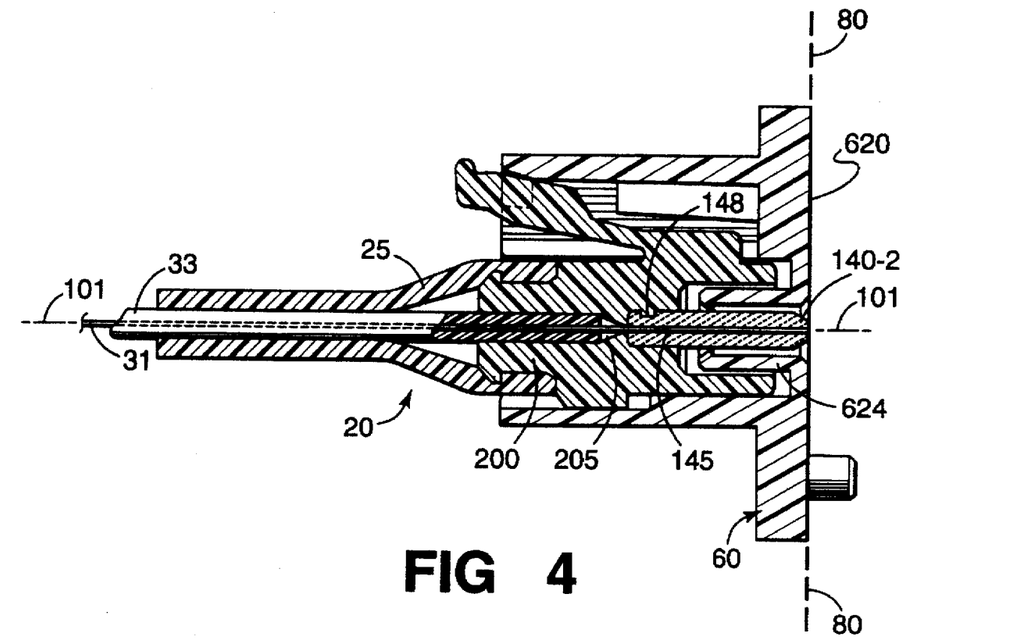
FIG. 4 shows a cross-section view of the optical connector having an immovable ferrule positioned within the associated receptacle.

FIG. 4 shows a cross-section view of the optical connector 20 having an immovable ferrule 140-2 positioned within a receptacle 60. The connector and the receptacle are cooperatively designed so that the end face of ferrule 140-2 is flush with the back surface 620 of the receptacle. In turn, this surface is coplanar with optical plane 80. It is important that the end face of immovable ferrule 140-2 be designed to terminate at the optical plane 80 so that it will properly abut with a movable ferrule 140-1 (see FIG. 6). Obviously, the immovable ferrule 140-2 will control the location where end-to-end contact takes place (i.e., at the optical plane) —a location where movable ferrule 140-1 is near the midpoint of its range of travel.

Immovable ferrule 140-2 is shown having a notch 148 which is positioned near the back end of the ferrule through with an uncoated end portion of optical fiber 31 is inserted into passageway 145. The notch needs to be located in that portion of the ferrule which resides within the housing 200 after molding in order to preclude rotational movement of the ferrule. In the preferred embodiment of the invention, the housing is overmolded onto the ferrule. Nevertheless, the ferrule can be pressed into a cylindrical cavity 206 (see FIG. 5) at the front end of the housing and adhesively held therein. In this situation, even though the central axes of bore 205 (of housing 200) and passageway 145 (of ferrule 140-2) reside substantially on the central axis 101—101 of the connector 20, the ferrule will need to include a funnel-shaped opening for receiving optical fiber 31. Without such a funnel, it is virtually impossible to assure that the narrow end of bore 205 is precisely lined up with passageway 145 unless the housing 200 is overmolded onto the ferrule 140-2. It is noted at this point that whereas only cylindrical ferrules (e.g., 140-1 and 140-2) are shown, the present invention is clearly applicable to non-cylindrical ferrules that hold an array of optical fibers. In this situation, bore 205 and axial passageway 145 would need to be appropriately shaped to receive the end portion of an optical fiber array inserted therein.

A bend-limiting boot 25 is mounted on the back end of housing 200 and surrounds buffered fiber 33. Although not shown in FIG. 4, elongated slender polymeric fibers of high tensile strength, such as aramid yarn, are frequently associated with the buffered fiber. These strength members are held in place by an adhesive, and can be placed in bore 205 or captured between the housing 200 and the boot 25. When such strength members are attached to the connector housing 200, tensile forces applied to the cable through the strength members are transferred to housing 200, and the connector 20 is said to be "pull-proof."

Figure 5:
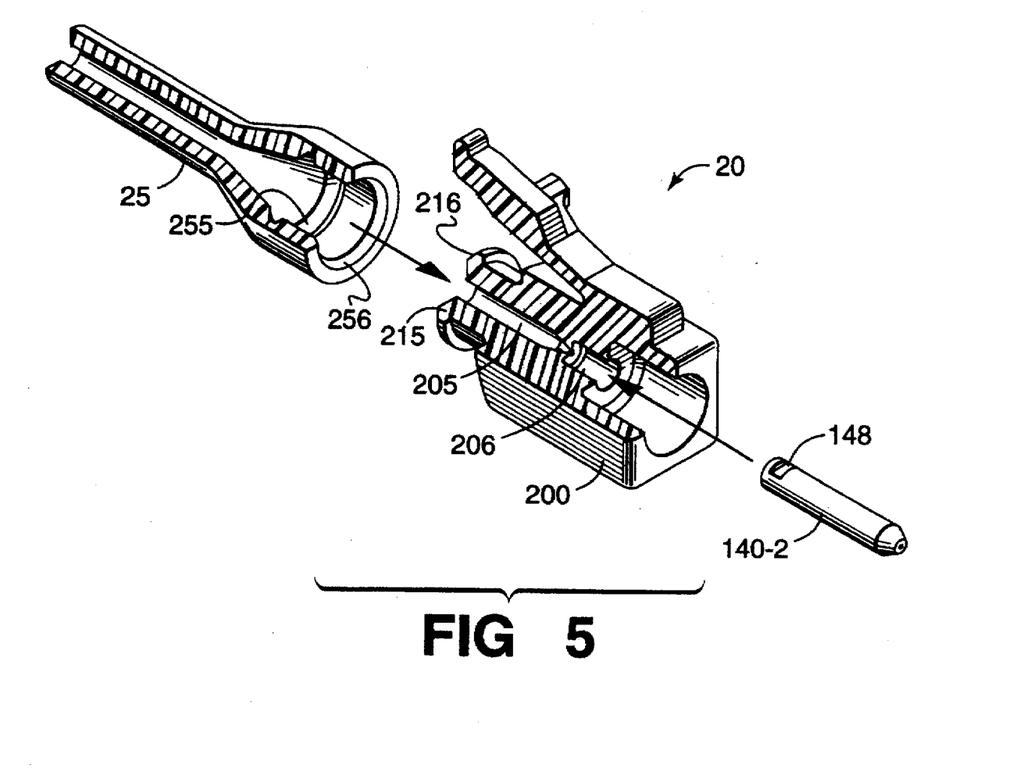
FIG. 5 is an exploded perspective view of the novel optical connector with a quarter section of its housing and bend-limiting boot removed to show details of its construction.

FIG. 5 is an exploded perspective view of the novel optical connector 20 with a quarter section of its housing 200 and bend-limiting boot 25 removed to provide greater detail regarding its construction. The boot is made from a suitably compliant material so that its back portion can be bent in a direction that is normal to its longitudinal axis. In the preferred embodiment of the invention, the bend-limiting boot is made from a thermoplastic rubber such as Santoprene® elastomer which is commercially available from Advanced Elastomer Systems, LP. So that the bending properties of the boot 25 are suitable for limiting the bend radius of the enclosed buffered fiber 33 over a predetermined load range. The boot will easily fit over a lip 215 at the back end of the housing 200, the lip includes a bevel 216 and the from end of the boot includes a bevel 256. A groove 255 within the boot is shaped to mate with lip 215.

Ferrule 140-2 is preferably insert-molded into the housing 200 and its axial passageway meets bore 205 at about the midpoint of the housing. As discussed above, flat notch 148 prevents the ferrule 140-2 from being pulled out of the housing and also from rotating within the housing.

Figures 6, 7:
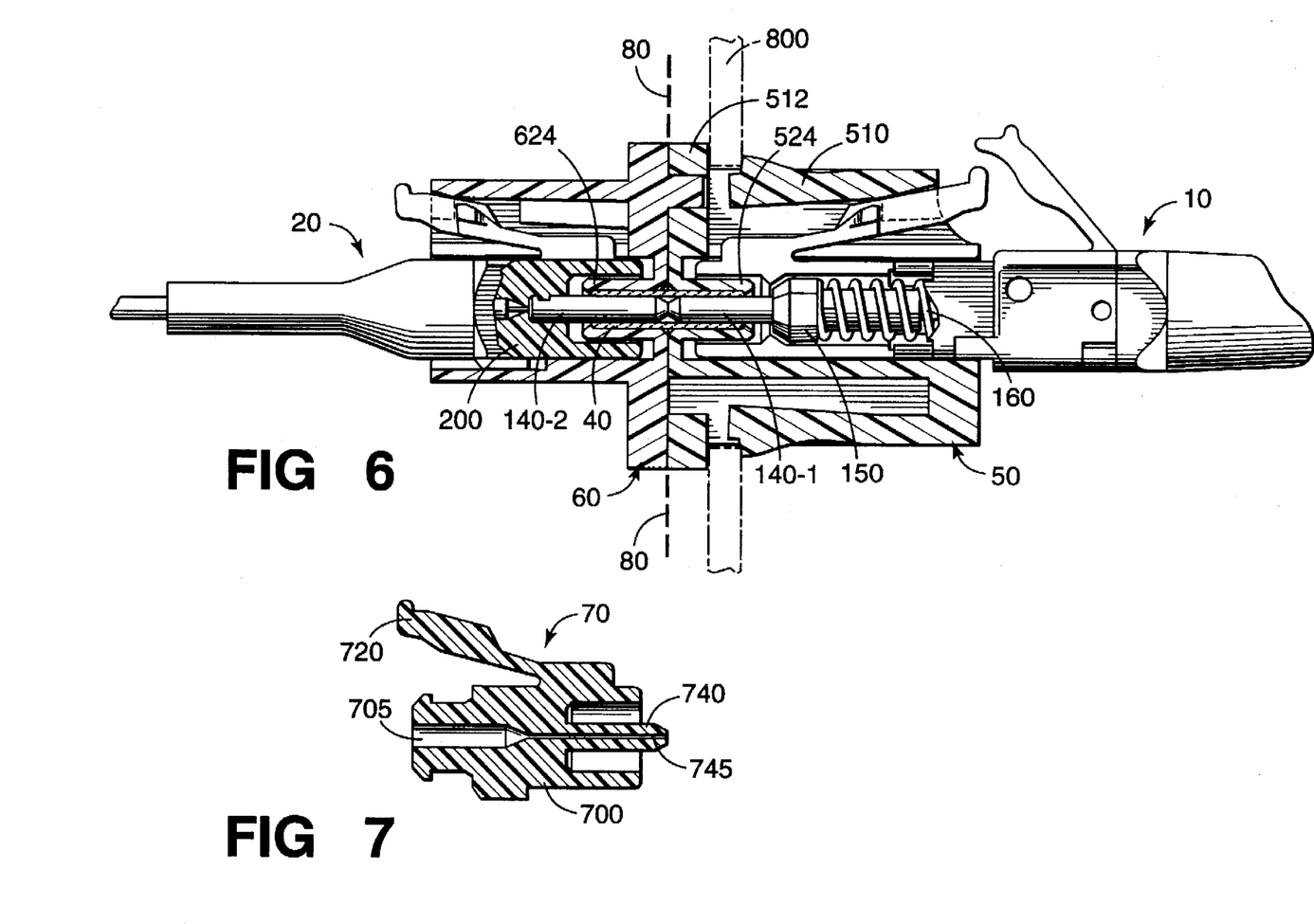
FIG. 6 is a partial cross-section view of an optical connector having an immovable ferrule (on the left) interconnected to an optical connector having a movable ferrule.
FIG. 7 is a cross-section view of an optical connector having an immovable ferrule molded as a unitary structure.

FIG. 6 discloses an almost-symmetrical interconnection between a pair of optical fibers meeting at optical plane 80. An while a connector-to-connector example is shown, it is clear that the connector can be joined to other optical devices. For improved clarity, certain portions of FIG. 6 are shown in cross section. Ferrules 140-1 and 140-2 are coaxially aligned when they are inserted into alignment sleeve 40 which is held by bosses 524, 624 within receptacles 50, 60 respectively. Each ferrule includes an axial passageway through which an end portion of an optical fiber (whose coatings have been removed) extends. A compression spring 160 surrounds base member 150 within connector 10, and urges ferrule 140-1 into engagement with immovable ferrule 140-2 contained within connector 20.

Connector 10 is considered a "floating" design wherein its ferrule is spring loaded and supported by alignment sleeve 40 within receptacle 50. When connector 10 is inserted into the receptacle 50, its associated ferrule 140-1 overtravels the optical plane (transverse centerline) 80 between the receptacles 50, 60. Thereafter, when connector 20 is inserted into receptacle 60 and contact between the end faces of the two ferrules 140-1, 140-2 is made, then ferrule 140-1 is pushed backwards while compression spring 160 maintains a constant, predetermined pressure on the ferrule end faces. If connector 20 is installed first, as is typically the case, then when connector 10 is inserted into receptacle 50, ferrules 140-1, 140-2 meet at the optical plane 80 and the housing for connector 10 moves forward, compresses spring 160, and enables connector 10 to latch.

The interconnection of receptacles 50, 60, and the manner in which they are held in a panel 800, is illustrated in FIG. 6. Receptacle 50 includes panel-locking members 510 which cooperate with flange 512 to capture an edge of panel 800 therebetween. Illustratively, the left-hand side of FIG. 6 comprises connections that are referred to as "inside wiring" because they reside behind panel 800 and are not readily accessible during normal usage. Similarly, the right-hand side of FIG. 6 comprises connections that are referred to as "outside wiring" because they reside on the side of panel 800 which is accessed during normal usage. Indeed, one particularly useful application of the present invention is to exclusively use optical connectors 20 having immovable ferrules on the "inside wiring" side of an equipment bay or the like. In this manner, one can be sure that two connectors 20 with immovable ferrules will never be interconnected. Such a simple rule also maximizes the use of the low-cost connectors in that inside wiring is usually done as a field-installable procedure, whereas outside wiring typically uses factory-assembled jumper plugs.

FIG. 7 is a cross-section view of a one-piece optical apparatus having an immovable ferrule in accordance with the invention. Apparatus 70 comprises a body member 700, a cylindrical member 740, and a latch member 720. A bore 705 extends through the body member, and a passageway 745 extends through the cylindrical member. The bore and the passageway meet at approximately the longitudinal midpoint of apparatus 70. This apparatus is molded from a thermoplastic material as a one-piece unit. And while other engineering polymers may be used, the thermoplastic material preferably comprises polycarbonate, Although various particular embodiments of the present invention have been shown and described, modifications are possible within the spirit and scope of the invention. These modifications include, but are not limited to, the use of different materials in the construction of the connector. For example, although polycarbonate is preferred, other plastic materials can be used recognizing that there are tradeoffs between cost and performance. Although zirconia ceramic ferrules are preferred, the use of glass, plastic or metal ferrules is possible. And although cylindrical ferrules are preferred, the use of a non-cylindrical ferrule (e.g., a rectangular solid ferrule) that holds an array of fibers is contemplated. And finally, the present invention accommodates the use of plastic fiber as well as glass.

We claim:

1. A connector for terminating an optical fiber comprising:

a one-piece molded plastic housing having an exterior latch for securing the housing to an associated receptacle, the latch comprising a cantilever having its fixed end positioned toward a front end of the housing, the housing including an axial bore for receiving an end portion of the optical fiber into its interior, the bore extending longitudinally from a back end of the housing toward a midpoint thereof; and a ferrule having an axial passageway for receiving the end portion of the optical fiber, the ferrule extending longitudinally from the midpoint of the housing toward a front end thereof and being positioned within the housing such that the bore and the passageway communicate with each other, said ferrule being immovably attached to the housing.

2. The connector of claim 1 wherein the ferrule is insert-molded into the plastic housing.

3. The connector of claim 2 wherein the ferrule is cylindrical in shape.

4. The connector of claim 3 wherein the cylindrical ferrule is made from zirconia.

5. The connector of claim 3 wherein the cylindrical ferrule comprises a drawn glass tube.

6. The connector of claim 3 wherein the cylindrical ferrule has an outer diameter of about 1.25 millimeters.

7. The connector of claim 1 wherein the ferrule is formed as an integral part of the molded plastic housing.

8. The connector of claim 1 wherein the housing further includes a key that prevents it from being inserted into a receptacle which does not include a mating keyway.

9. The connector of claim 1 further including a bend-limiting boot surrounding the back end of the housing.

10. In combination, an optical cable and a connector, the optical cable comprising an optical fiber enclosed within a plastic buffer material; and the connector comprising (i) a one-piece molded plastic housing having an exterior latch for securing the housing to an associated receptacle, the latch comprising a cantilever beam having its fixed end positioned toward a front end of the housing, the housing including a first passageway for receiving an end portion of the optical fiber into its interior, the first passageway extending longitudinally from a back end of the housing toward a midpoint thereof; and (ii) a fiber-holding structure having a second passageway for receiving the end portion of the optical fiber, the fiber-holding structure extending longitudinally from the midpoint of the housing toward a front end thereof and being positioned within the housing such that the first and second passageways communicate with each other, said fiber-holding structure being immovably attached to the housing.

11. The combination of claim 10 further including a flexible boot having a longitudinal passageway which surrounds the optical cable, a front portion of the flexible boot surrounding the back end of the housing, said boot being adapted to limit the minimum bending radius of the optical cable in the region where it joins the connector.

12. An optical interconnection between first and second optical connectors, each having a longitudinal axis and a front end, the front ends of said optical connectors being joined end to end within an adapter, the first optical connector comprising a one-piece molded housing having a latch member on an outside surface thereof for securing it to an input side of the adapter, and a ferrule which is immovably attached to the housing, the latch member comprising a cantilever having its fixed end positioned toward a front end of the housing, said housing including an opening in its back end for receiving an optical fiber and an opening in its front end for enabling the immovable ferrule to protrude therethrough;

the second optical connector comprising a housing having a latch member on an outside surface thereof for securing it to an output side of the adapter, and a spring-loaded ferrule which is movably held within the housing, the latch member comprising a cantilever having its fixed end positioned toward the front end of the housing, said housing including an opening in its back end for receiving an optical fiber, and said housing including an opening in its front end for enabling the movable ferrule to protrude therethrough; and the adapter including a pair of jack receptacles that are joined together back to back, each jack receptacle having a generally rectangular cavity for receiving an optical connector in its from end, each cavity having a latch-retaining ledge for interlocking with a latch member, and each cavity having a generally circular opening in a back end thereof for enabling a ferrule to exit the cavity.

13. The optical interconnection of claim 12 wherein the adapter further includes an alignment sleeve for holding the ferrules of the first and second optical connectors in axial alignment, said alignment sleeve being captured between the pair of jack receptacles and extending into said circular openings at the back ends of their cavities.

14. The optical interconnection of claim 12 wherein the housing of the first optical connector is a molded plastic part, and wherein the ferrule of the first optical connector is insert-molded into the housing.

15. The optical interconnection of claim 12 wherein the housing and the ferrule of the first optical connector comprise a one-piece molded plastic part.

16. Optical apparatus molded from a thermoplastic material as a one-piece unit, said apparatus having a longitudinal axis that extends between front and back ends thereof and comprising:

a generally rectangular solid body member having a cantilever latch on an outside surface thereof with its fixed end positioned toward the front end of the apparatus, the body including a bore for receiving an end portion of an optical fiber, said bore extending from a midpoint of the body toward the back end of the apparatus and having a central axis that is collinear with the longitudinal axis of the apparatus; and a fiber-holding member protruding from the body, said fiber-holding member extending from the midpoint of the body toward the from end of the apparatus and having a central axis that is collinear with the longitudinal axis of the apparatus, said fiber-holding member being immovably attached to the body.

17. The optical apparatus of claim 16 wherein the thermoplastic material comprises polycarbonate.

18. The optical apparatus of claim 16 further including a bend-limiting boot surrounding the back end of the body member.

19. The optical apparatus of claim 16 wherein the fiber-holding member is cylindrical and has an outer diameter of about 1.25 millimeters.

20. The optical apparatus of claim 16 wherein the body member further includes a key which prevents it from being inserted into a receptacle that does not include a mating keyway.

* * * * *